(12) United States Patent
Nakabayashi

(10) Patent No.: US 7,715,468 B2
(45) Date of Patent: *May 11, 2010

(54) QOS CONTROL METHOD FOR TRANSMISSION DATA FOR RADIO TRANSMITTER AND RADIO RECEIVER USING THE METHOD

(75) Inventor: Sumie Nakabayashi, Kokubunji (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 346 days.

This patent is subject to a terminal disclaimer.

(21) Appl. No.: 11/713,637

(22) Filed: Mar. 5, 2007

(65) Prior Publication Data

US 2007/0153921 A1 Jul. 5, 2007

Related U.S. Application Data

(63) Continuation of application No. 10/646,769, filed on Aug. 25, 2003, now Pat. No. 7,274,730.

(30) Foreign Application Priority Data

Aug. 26, 2002 (JP) ............................. 2002-244836

(51) Int. Cl.
*H04B 1/38* (2006.01)
*H04L 5/16* (2006.01)

(52) U.S. Cl. ...................... 375/220; 375/222; 375/219; 375/261; 455/452.1; 455/452.2; 370/334; 370/332

(58) Field of Classification Search ................. 375/220, 375/222, 219, 261; 455/452.2, 452.1; 370/334, 370/332
See application file for complete search history.

(56) References Cited

U.S. PATENT DOCUMENTS

| 6,662,024 B2 | 12/2003 | Walton et al. ............. 455/562.1 |
| 6,748,220 B1 | 6/2004 | Chow et al. .................. 455/450 |
| 7,020,110 B2 | 3/2006 | Walton et al. ............... 370/334 |
| 7,274,730 B2 * | 9/2007 | Nakabayashi ............... 375/220 |

FOREIGN PATENT DOCUMENTS

JP 1093650 4/1998

(Continued)

OTHER PUBLICATIONS

ANSI/IEEE Std. 802.1D, 1998 Edition, pp. 39-41.

(Continued)

*Primary Examiner*—Phuong Phu
(74) *Attorney, Agent, or Firm*—Brundidge & Stanger, P.C.

(57) ABSTRACT

A radio transmitter/receiver having a QoS control unit for outputting the transmission data in order taking the quality of service (QoS) into consideration. In the case where the information transmission rate for a radio section is not lower than a threshold value, the QoS control operation of the transmission data is omitted, and the transmission data are output in the order of input. In the case where the information transmission rate for the radio section is lower than the threshold value, on the other hand, the QoS control mode is switched in accordance with the information transmission rate for the radio section.

14 Claims, 12 Drawing Sheets

FOREIGN PATENT DOCUMENTS

| | | |
|---|---|---|
| JP | 200294449 | 3/2002 |
| JP | 2002199033 | 7/2002 |
| JP | 2002290246 | 10/2002 |
| JP | 2002290258 | 10/2002 |
| JP | 200332183 | 1/2003 |

OTHER PUBLICATIONS

E. Rosen et al "Multipleprotocol Label Switching Architecture", RFC3031, pp. 8-11, Jan. 2001.

S. Blake, et al "An Architecture for Differentiated Services", RFC2475, pp. 10-18, Dec. 1998.

Toyoki Ue et al, "Symbol Rate and Modulation Level-Controlled Adaptive Modulation/TDMA/TDD System for High-Bit-Rate Wireless Data Transmission" IEEE Trans. on Vehicular Technology, vol. 47, Nov. 1998.

J. Rexford et al "A Scaleable Architecture for Fair Leakey-Bucket Shaping", IEEE 1997.

High-Speed Physical Layer in the 5 GHz Band, IEEE Std 802, 11a, p. 7, 1999.

* cited by examiner

QoS CONTROL 11

UDP HEADER 42

CLASSIFICATION TABLE 32
SHOWING CORRESPONDENCE TO PORT NO.

| PORT NO. | CLASS |
|---|---|
| 80 | 0 |
| 2050 | 3 |
| 2010 | 1 |
| ⋮ | ⋮ |

FIG.11

QoS CONTROL MODE TABLE 33

| PRIORITY CONTROL | ENABLE BIT FLAG | | |
| --- | --- | --- | --- |
| | X < B | B ≦ X < A | A ≦ X |
| 「802.1D」 | 1 | 1 | 0 |
| 「PORT NO.」 | 0 | 1 | 0 |
| 「CONTROL POLICY A」 | 1 | 0 | 0 |
| ⋮ | ⋮ | ⋮ | ⋮ |

1 : YES
0 : NO

FIG.12

CONTROL POLICY A CLASSIFICATION TABLE F34

| PROTOCOL | SOURCE IP ADDRESS | DESTINATION IP ADDRESS | SOURCE PORT NO. | DESTINATION PORT NO. | SOURCE MAC ADDRESS 341 | DESTINATION MAC ADDRESS | CLASS 342 |
|---|---|---|---|---|---|---|---|
| — | — | — | — | — | 11-22-33-00-00-01 | — | 3 |
| — | — | — | — | — | 11-22-33-00-00-02 | — | 3 |
| — | — | — | 80 | — | — | — | 7 |
| --- | --- | --- | --- | --- | --- | --- | --- |

Prior Art

FIG. 13

IEEE802.1D PRIORITY CLASSIFICATION 31

| TRAFFIC TYPE | PRIORITY (CLASS) |
|---|---|
| Background | 1 |
| Spare | 2 |
| Best Effort | 0 (Default) |
| Excellent Effort | 3 |
| Controlled Load | 4 |
| Video | 5 |
| Voice | 6 |
| Network Control | 7 |

FIG. 14

CLASS-WISE BAND ASSIGNMENT TABLE 35

| CLASS | GUARANTEED BAND |
|---|---|
| 0 | 50 Mbit/s |
| 1 | 5 Mbit/s |
| 2 | 5 Mbit/s |
| 3 | 5 Mbit/s |
| 4 | 5 Mbit/s |
| 5 | 10 Mbit/s |
| 6 | 10 Mbit/s |
| 7 | 5 Mbit/s |

FIG. 19

| RECEIVING SIGNAL LEVEL | MODULATION SCHEME | CODE | INFORMATION TRANSMISSION RATE |
|---|---|---|---|
| -60 dBm OR MORE | 64QAM | 3 | 100 Mbit/s |
| -67~-60dBm | 16QAM | 2 | 70 Mbit/s |
| -75~-67dBm | QPSK | 1 | 35 Mbit/s |
| -75 dBm OR LESS | BPSK | 0 | 17 Mbit/s |

FIG. 20A

DATA TRANSMISSION FRAME FORMAT

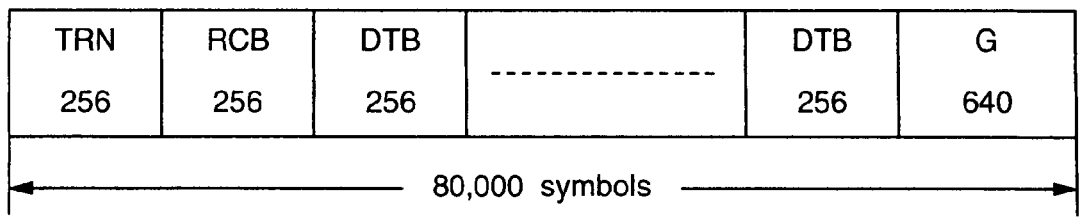

| TRN 256 | RCB 256 | DTB 256 | ---------------- | DTB 256 | G 640 |

← 80,000 symbols →

(NOTE) NUMERALS IN COLUMNS INDICATE SYMBOL NUMBER

FIG. 20B

RCB CONFIGURATION

| MODTYPE | MAINTENANCE INFORMATION | SPARE |

MODTYPE:   0: BPSK, 1: QPSK, 2: 16QAM, 3: 64QAM

FIG. 20C

DTB CONFIGURATION

| TRANSMISSION DATA |

QOS CONTROL METHOD FOR TRANSMISSION DATA FOR RADIO TRANSMITTER AND RADIO RECEIVER USING THE METHOD

The present application is a continuation of application Ser. No. 10/646,769, filed Aug. 25, 2003, now U.S. Pat. No. 7,274,730, the contents of which are incorporated herein by reference.

BACKGROUND OF THE INVENTION

The present invention relates to a radio transmitter/receiver, or in particular to the QoS (Quality of Service) control of the transmission data in a radio transmitter/receiver.

In recent years, IP (internet protocol) has come to be employed for more and more networks with the extension of the internet and an inexpensive IP communication network. In the IP network, data are delivered to a destination from a transmitter in accordance with the IP. The IP is a protocol for a network layer (third layer) in the OSI reference model. Upper protocols include a TCP (transmission control protocol) and a UDP (user datagram protocol) in the transport (fourth) layer. The TCP and UDP have the function of acting as an intermediary between the IP and an application program. The protocols lower than IP, on the other hand, include those for a data link layer (second layer) and a physical layer (first layer). The Ethernet defined under IEEE802.3 and the radio LAN defined under IEEE802.11 are examples.

The radio LAN technique is used also for radio access to realize a subscriber network by radio, and various applications (including the WEB access, IP telephone and TV conference) have become possible to execute with the IP network in both a radio system and a wire system. Applications include those requiring the real-time operation such as video distribution and IP telephone, and those requiring no real-time operation such as the file data downloading.

In the IP network, on the other hand, in order to deliver time critical data such as the voice and video to the destination device within a predetermined time, the QoS control operation is used in which the transmission data are classified according to traffic type in the network and transferred by each node taking the QoS into consideration. The QoS control technique well known for the IP network includes, for example, MPLS or DiffServ at the network layer level and IEEE802.1D at the data link layer level.

The disclosure of IEEE802.1D is hereby incorporated by reference.

MPLS is described, for example, in "Multiprotocol Label Switching Architecture" by E. Rosen et al., RFC3031, pp. 8-11, January 2001. DiffServ, on the other hand, is described, for example, in "An Architecture for Differentiated Services" by S. Blake et al., RFC2475, pp. 10-18, December 1998.

IEEE802.1D concerns a QoS control technique for the wire LAN, and implemented in such a manner that a priority indication label is attached to the header of the Ethernet frame, for example, and each bridge unit sets the transfer frames in a queue in the order of priority. According to IEEE802.1D, as shown in the priority classification of FIG. 13, for example, the traffic is divided into seven types 311 including "network control", "voice", "video", "controlled load", "excellent effort", "best effort" and "background", and the priority 312 is defined for each traffic type.

The "network control" is the traffic required for maintaining the network environment and handled with the highest priority "7". The "voice" and "video" which are limited in delay time and jitters, on the other hand, have the next highest priority of "6" and "5", respectively, following the network control. These traffic types are followed by the "controlled load", the "excellent effort", the "best effort" and the "background" in that order of priority. The priority of the normal LAN traffic including the mail and WEB are set in the category of "best effort".

In radio communication, on the other hand, an adaptive modulation system has been proposed in which high-speed communication is established under satisfactory conditions of the radio section, while the communication rate is reduced in a deteriorated radio environment. Refer, for example, to "Symbol Rate and Modulation Level-Controlled Adaptive Modulation/TDMA/TDD System for High-Bit-Rate Wireless Data Transmission" by Toyoki Ue et al., IEEE Trans. on Vehicular Technology, Vol. 47, November 1998, the disclosure of which is hereby incorporated by reference, and JP-A-10-93650, JP-A-2002-290246 and JP-A-2002-199033.

SUMMARY OF THE INVENTION

A system employing the adaptive modulation for radio communication poses the problem that the information transmission rate undergoes a change depending on the conditions of the radio section. Thus, demand has arisen for a QoS control technique which can maintain the required network environment even in the case where the information transmission conditions undergo a change in the radio section.

Assume that the conventional QoS control technique for the wire LAN described above is used for the radio communication system of adaptive modulation type for the radio section. The radio transmitter reads the label information added to the header or the transmission data, and classifies the transmission data according to the label information. This process of transmission data classification consumes considerable length of time, and an increased delay time of data transmission reduces the throughput.

In the case where the information transmission rate for the radio section is higher than the transmission rate of the transmission data supplied to the radio transmitter, no waiting time basically occurs for the transmission data in the radio transmitter. In the conventional QoS control technique, however, all the transmission data are classified on the assumption that the transmission waiting time occurs on the output line. Therefore, the QoS control unit requires a high-speed processing circuit, thereby leading to the problem of a high system cost.

Accordingly, an object of this invention is to provide a QoS control method and system used with a radio transmitter/receiver, in which the delay time of data transmission under QoS control is shortened and the data throughput can be improved.

Another object of the invention is to provide a radio transmitter/receiver in which the delay time of the data transmission under QoS control is shortened and the data throughput can be improved.

Still another object of the invention is to provide a radio transmitter/receiver of adaptive modulation type, in which the delay time of the data transmission under the QoS control is shortened and the data throughput is improved.

According to one aspect of the invention, there is provided a QoS control system used for a radio transmitter/receiver, comprising:

a QoS control unit for supplying the transmission data to the modulation unit of the radio transmitter/receiver in the order taking the QoS into consideration; and a determining unit connected to the QoS control unit for determining whether the QoS control operation of the transmission data is required or not in accordance with the information transmission conditions in the radio section;

wherein the QoS control operation of the transmission data is selectively performed by the QoS control unit in accordance with the information transmission conditions in the radio section.

One preferable feature of the invention lies in that the QoS control unit has a first operation mode for outputting the transmission data in the order of input thereto and a second operation mode for outputting the transmission data in the order taking the QoS into consideration, the first and second operation modes being adapted to be switched in accordance with the information transmission conditions in the radio section.

Another preferable feature of the invention lies in that the QoS control unit includes a comparator for comparing the information transmission rate for the radio section with a predetermined threshold value, and in the case where the information transmission rate for the radio section is lower than the predetermined threshold value, the QoS control operation is switched to the second operation mode, while in the case where the information transmission rate for the radio section is higher than the predetermined threshold value, on the other hand, the QoS control operation is switched to the first operation mode.

Still another preferable feature of the invention lies in that the QoS control unit has a plurality of QoS control modes, and the QoS control operation for the transmission data is switched between a plurality of the QoS control modes in accordance with the information transmission rate for the radio section.

Yet another preferable feature of the invention lies in that the QoS control unit has a QoS control mode table for defining the relation between the range of the transmission rate for the radio section and the QoS control mode applicable to the transmission data, and the QoS control mode applicable to the transmission data is determined in accordance with the information transmission rate for the radio section with reference to the QoS mode table.

A further preferable feature of the invention lies in that the QoS control unit has a classification table corresponding to a specified QoS control mode defined in the QoS control mode table, the classification table defines the class of each transmission data corresponding to the value of specific header information included in the transmission data, and the QoS control unit determines the class of the transmission data in the specific QoS control mode with reference to the classification table.

According to an embodiment of the invention, in the case where the information transmission rate for the radio section is not lower than a predetermined threshold value, the QoS control operation for the transmission data is omitted, and therefore the data transmission with minimized transmission delay in the QoS control unit is made possible for an improved data throughput. Also, the omission of the QoS control operation requiring a high speed makes possible a comparatively inexpensive hardware configuration of the radio transmitter.

According to an embodiment of the invention, the QoS control operation for the transmission data is carried out in the case where the information transmission rate for the radio section decreases below the predetermined threshold value. In this case, a time margin is generated for supplying the transmission data to the radio transmission circuit, and therefore the transmission delay due to the QoS control process has a smaller effect on the throughput. Also, the aforementioned time margin increases with the decrease in the information transmission rate for the radio section. Therefore, the QoS control operation is also made possible by a QoS control unit having a plurality of QoS control modes which are switched in accordance with the information transmission conditions in the radio section in such a manner that a more complicated QoS control operation is used with the decrease in the transmission rate.

Other objects, features and advantages of the invention will become apparent from the following description of the embodiments of the invention taken in conjunction with the accompanying drawings.

BRIEF DESCRIPTION OF THE DRAWINGS

FIG. 11 is a diagram showing a QoS control mode table 33.

FIG. 12 is a diagram showing a classification table 34 for the control policy A.

FIG. 13 is a diagram for explaining the priority (class) defined under IEEE802.1D.

FIG. 14 is a diagram showing a class-wise band assignment table 35.

FIG. 15 is a diagram showing a frame format under IEEE802.11a.

FIG. 19 is a diagram showing an example of the correspondence table between the receiving level and the modulation scheme used in a propagation path estimation unit.

FIGS. 20A, 20B, 20C are diagrams showing an example of the data transmission frame format.

DESCRIPTION OF THE EMBODIMENTS

Figure 1:
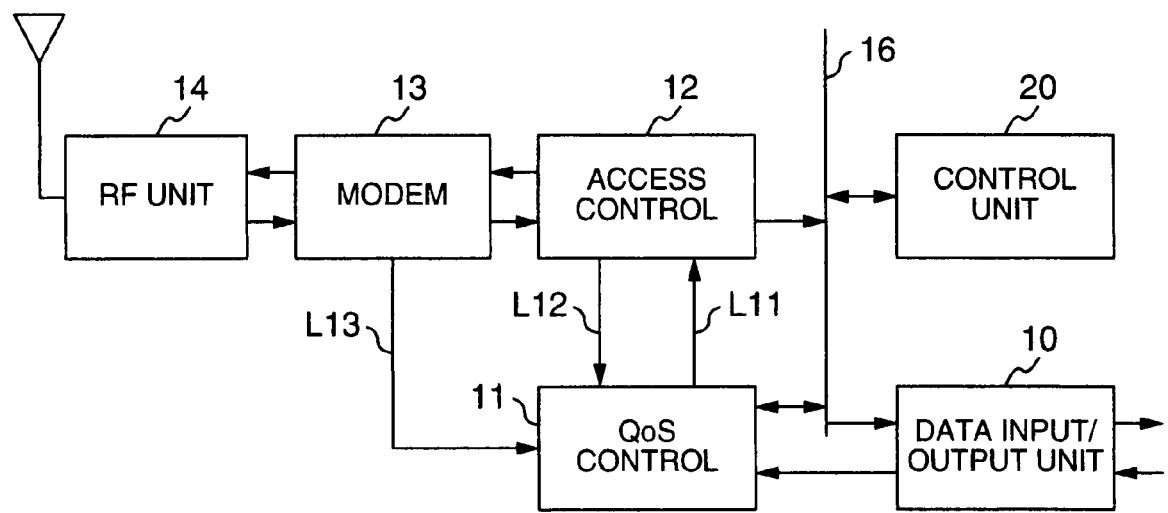
FIG. 1 is a block diagram showing a radio transmitter/receiver according to an embodiment of the invention.

Embodiments of the invention will be explained in detail below with reference to the accompanying drawings, in which similar component parts are designated by the same reference numerals, respectively.

FIG. 1 is a block diagram showing a configuration of a radio transmitter/receiver according to an embodiment of the invention. The radio transmitter/receiver comprises a data input/output unit 10, a QoS control unit 11 making up the essential part of the invention, an access control unit 12 for receiving the transmission data subjected to QoS control from the QoS control unit 11, a modem 13, a RF unit 14, an antenna unit 15, an internal bus 16 and a control unit 20. The modem 13 is of adaptive modulation type with the data transmission rate variable depending on the conditions in the radio section.

The QoS control unit 11 performs the selective QoS control operation on the transmission data supplied from the data input/output unit 10, in accordance with the radio transmission rate of the information input through a signal line L13 from the modem 13, and outputs the transmission data to the access control unit 12 through the signal line L11. The transmission data is output from the access control unit 12 to the modem 13, and after being modulated in the modem 13, converted into a radio frequency at the RF unit 14 and transmitted to the radio section from the antenna unit 15.

The radio signal received from the antenna unit 15, on the other hand, after being frequency-converted by the RF unit 14, is demodulated by the modem 13 according to a demodulation scheme corresponding to the modulation scheme for transmission, and input to the access control unit 12 as received data. The access control unit 12 has the function as a formatter for deleting the sync bits of the demodulated received data and/or demultiplexing the demodulated received data. The received data are transferred from the access control unit 12 through the internal bus 16 to the data input/output unit 10 and output as the received information.

The control unit 20 controls the whole of the radio transmitter/receiver. The control unit 20, the QoS control unit 11 and the access control unit 12 are shown as individual elements. Nevertheless, the QoS control unit 11 and the access control unit 12 may be integrated with each other, so that the functions of the respective control units may be implemented either by the software executable on a single processor or by the software executed on the control unit (processor) 20.

Figure 15:
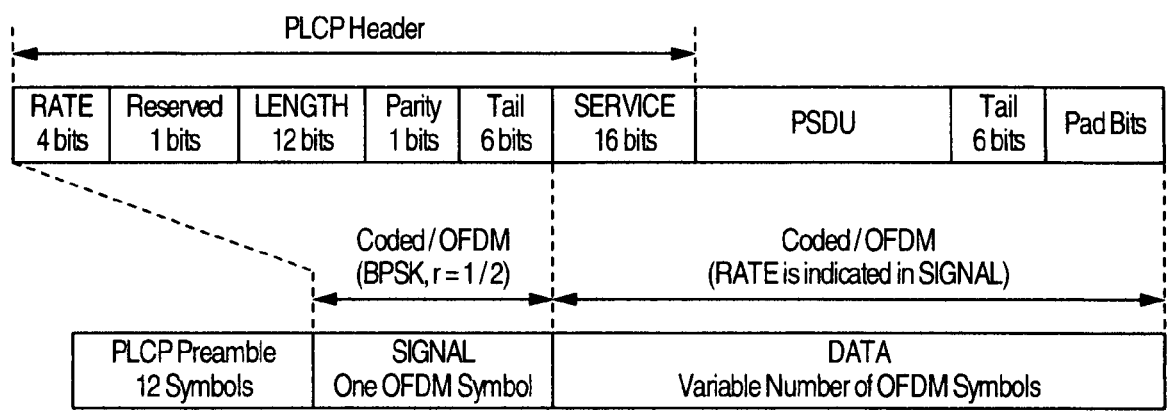

The access control unit 12 may be so configured as to generate the transmission data of the format defined by, for example, IEEE Std 802.11a, page 7, §17.3.2 PLCP frame format. FIG. 15 shows the PLCP frame format. In FIG. 15, the transmission rate (modulation scheme) of the DATA field is defined by the RATE bits of the SIGNAL field. The SIGNAL field is transmitted at a fixed rate.

Figure 2:
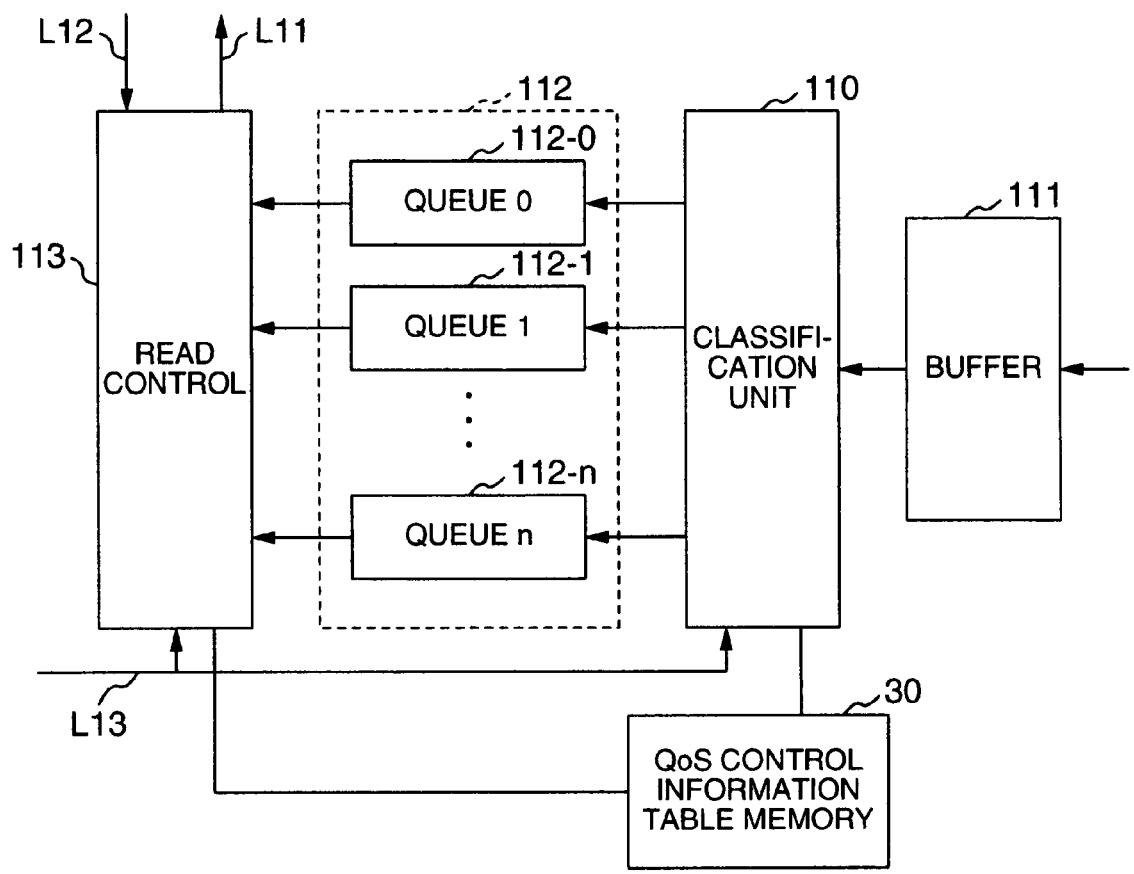
FIG. 2 is a detailed diagram showing the QoS control unit 11 in FIG. 1.

FIG. 2 is a diagram showing the QoS control unit 11 in detail.

The QoS control unit 11 includes a buffer memory 111 for temporarily holding the transmission data supplied from a data input/output unit 10, a classification processing unit 110, a transmission buffer memory 112 with transmission queues 112-0 to 112-n formed by class, a read control unit 113 for reading the transmission data from the transmission buffer memory 112 in the order set taking QoS into consideration and outputting the transmission data to the access control unit 12 through a signal line L11, and a memory 30 for the QoS control information table accessed by the classification processing unit 110 and the read control unit 113.

Figure 3:
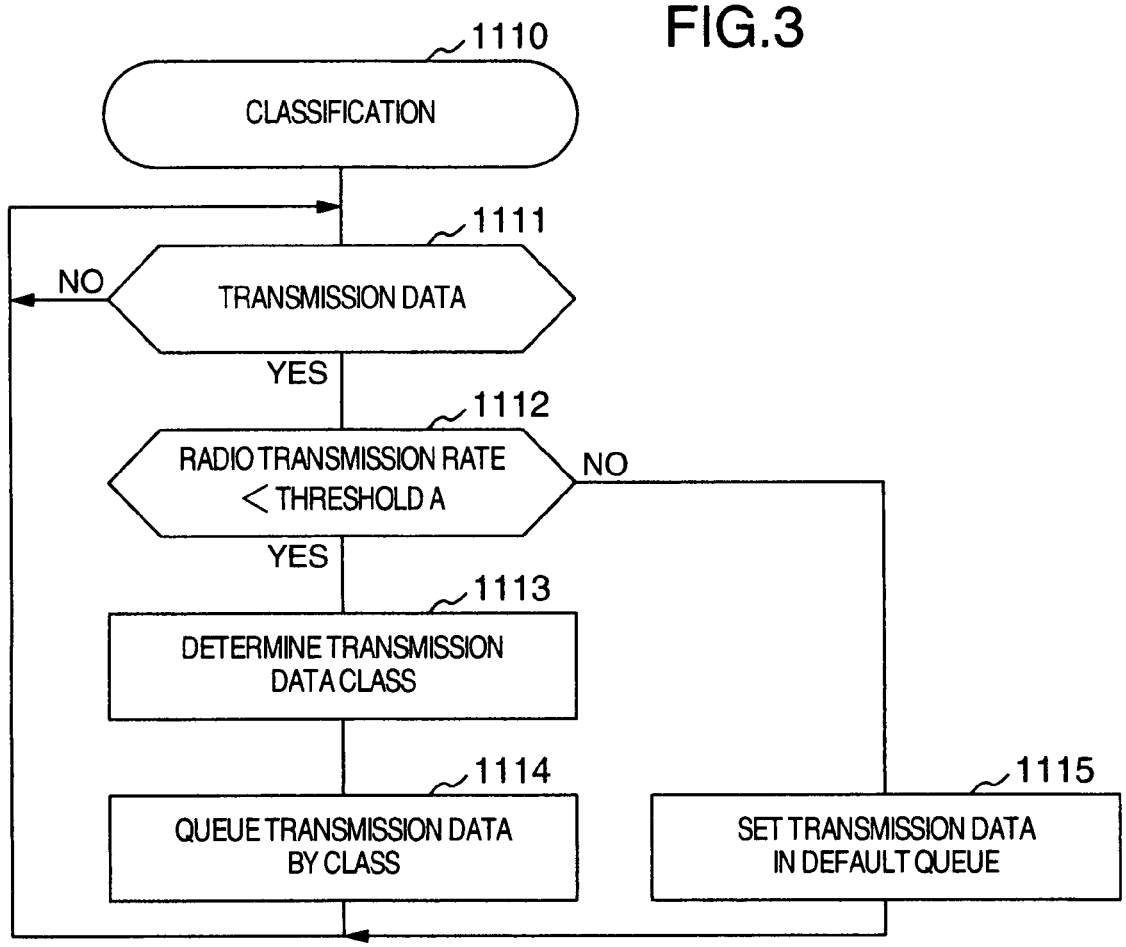
FIG. 3 is a flowchart showing the operation of the classification unit 110 shown in FIG. 2.

FIG. 3 is a flowchart showing the operation (the priority determining process 1110) of the classification processing unit 110.

The classification processing unit 110 determines whether the transmission data has arrived at the buffer memory 111 or not (step 1111), and upon arrival of the transmission data, checks the radio transmission rate X of the information input through the signal line L13 from the modem 13 (step 1112). In the case where the information transmission rate X for the radio section is not lower than a predetermined threshold valve A, the QoS control processing is omitted, and the transmission data is stored (set) in the default transmission queue 112-0 (step 1115). The threshold value A indicates, for example, the maximum transmission rate of the transmission data input from the data input/output unit 10. The transmission rate X not lower than the threshold value A indicates a state in which the transmission data in the transmission buffer 112 develops no congestion (waiting time).

According to this invention, only in the case where the information transmission rate X for the radio section is smaller than the threshold value A, i.e. only in the case where the transmission data develops a congestion, the QoS control operation is executed. In this case, the classification processing unit 110 determines the class p of the transmission data with reference to the QoS control information table memory 30 (step 1113), and stores the transmission data in the transmission queue 112-p corresponding to the class p (step 1114). After one transmission data is stored in the transmission queue 112-0 or 112-p, the process returns to step 1111 to repeat a similar operation for the next transmission data.

According to this embodiment, the QoS control operation is performed independently of a remote station. The information transmission rate X for the radio section, therefore, is derived from the modulation scheme selected by a propagation path estimation means (not shown) (see the propagation path estimation means 11-1 in FIG. 16) of the local station. Once the modulation scheme is estimated, the information transmission rate X is determined from the table of FIG. 19 showing the correspondence between the receiving level and the modulation scheme. As an alternative, the QoS control operation may be performed in accordance with the remote station. In this case, the information transmission rate of the local station and the modulation scheme are determined from the information transmission rate X included in the received data.

Figure 4:
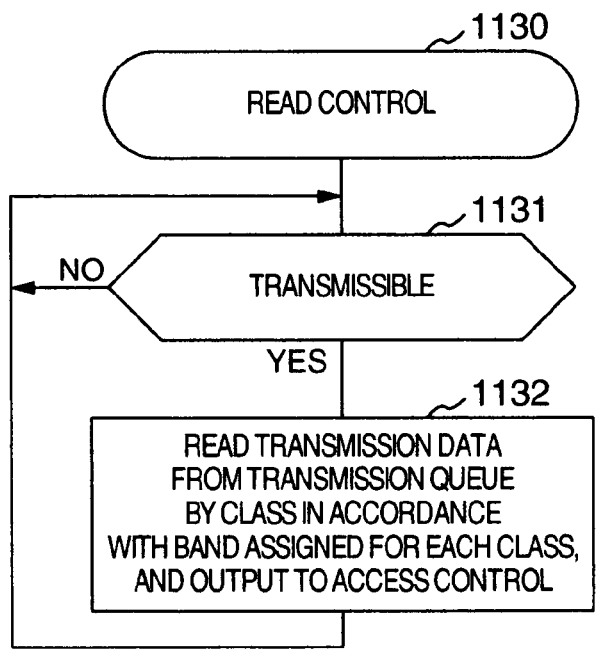
FIG. 4 is a flowchart showing the operation of the read control unit 113 shown in FIG. 2.

FIG. 4 is a flowchart showing the operation of the read control unit 113 (the read control processing 1130).

The read control unit 113 determines whether data transmission is possible or not from the state of the enable signal output to the signal line L12 from the access control unit 12 (step 1131). In the case where data transmission is possible, the transmission data is read in accordance with the band guaranteed for each class from the transmission queue of the transmission buffer memory 112 and output to the access control unit 12 through the signal line L11 (step 1132).

The token bucket (or leaky bucket) scheme is known for reading the transmission data in accordance with the band guaranteed by class. See for example "A scalable Architecture for Fair Leaky-Bucket Shaping", Jennifer Rexford et al., IEEE1997. According to this scheme, each transmission queue has tokens corresponding to the band, and transmission is permitted as long as at least transmission data length tokens are held. The tokens are supplemented in accordance with the guaranteed band at regular time intervals and consumed in accordance with the data transmission amount. The read control unit 113 supplements the tokens by reference to the class-wise band assignment memory area in the QoS control information table memory 30 at regular time intervals, and consumes the tokens when reading the data.

According to this invention, the classification process can be executed in step 1113 of FIG. 3 in accordance with the method defined by, for example, IEEE802.1D described above. The classification processing unit 110 reads the priority indication label included in the transmission data or the header portion thereof, and determines the priority (class) p of each transmission data. The transmission data is thus set in the transmission queue 112-p of the class corresponding to the priority. In this method, however, the priority indication label is added to all the transmission data as a prerequisite. In the case where the priority indication label is not added to the transmission data, therefore, the QoS control operation cannot be performed.

In view of this, according to the first embodiment of the invention, the class of each transmission data can be determined by using the classification table defining the class corresponding to the value of specific header information extracted from the header portion of the transmission data, even in the case where the priority indication label is not attached to the transmission data.

An embodiment in which the class is determined from the port number as header information will be explained below.

Figure 5:
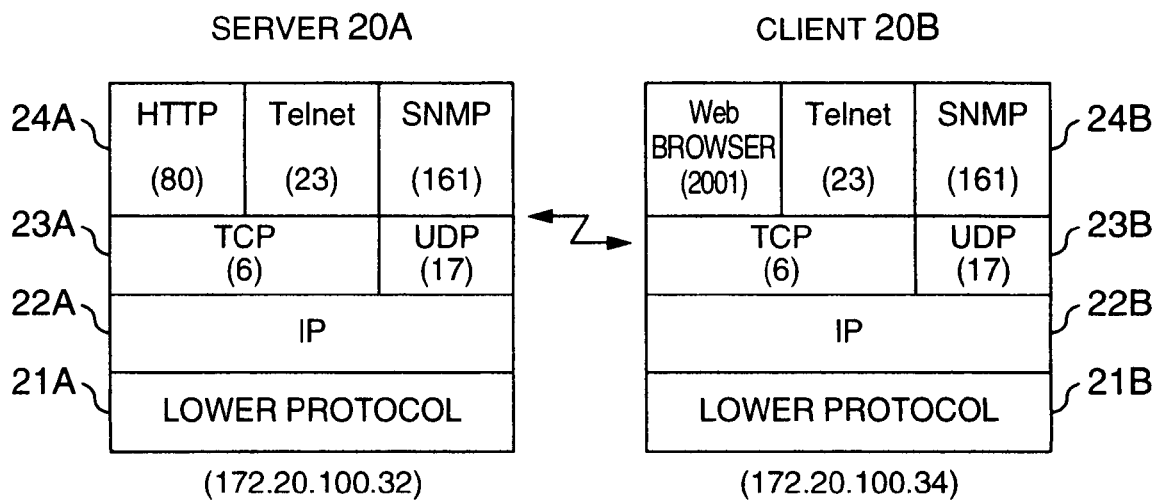
FIG. 5 is a diagram showing an example of communication to which the radio transmitter/receiver according to the invention is applicable.

FIG. 5 shows an example of communication using a radio transmitter/receiver according to the invention, in which a radio client 20B accesses the Web page on a server 20A using a Web browser.

The radio client terminal 20B is assigned an IP address "172.20.100.34", for example, and equipped with TCP and UDP above the IP 22B as a transport layer 23B on the one hand, and Web browser and Telnet above TCP and SNMP (simple network management protocol) above UDP as an application layer 24B on the other. TCP and UDP are identified by the protocol numbers "6" and "17", respectively, and Telnet and SNMP by the port numbers "23" and "161", respectively. Also, the Web browser is specified by "2001" which is a port number arbitrarily assigned by the client.

On the other hand, the server 20A has an IP address "172.20.100.32", and is equipped with TCP and UDP above the IP 22A as a transport layer 23A on the one hand, and HTTP and Telnet above TCP and SNMP above UDP as an application layer 24A on the other. HTTP is identified by the port number "80".

Figure 6:
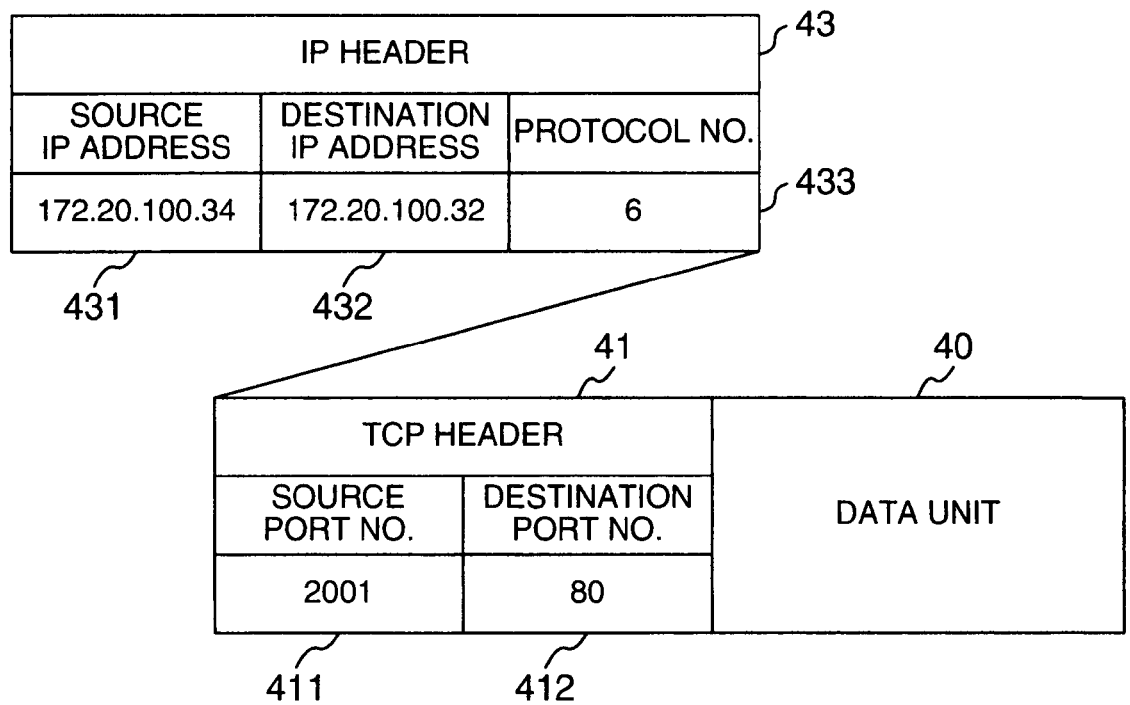
FIG. 6 is a diagram showing an example of the header contents of an IP packet exchanged between the client 20B and the server 20A shown in FIG. 5.

In accessing the Web page, the Web browser of the client 20B communicates with the HTTP of the server 20A. In the process, the IP packet 400 transmitted from the client 20B to the server 20A has the header with the contents thereof shown in FIG. 6, for example.

The IP packet 400 includes a data field 40, a TCP header 41 and an IP header 43. The TCP header 41 includes a transmitter port number 411 indicating the Web browser and a destination port number 412 indicating the HTTP. Also, the IP header 43 includes a transmitter IP address 431 indicating the client 20B, a destination IP address 432 indicating the server 20A and a protocol number 433 indicating that the applicable protocol for the transport layer header 41 following the IP header is TCP.

Figure 7:
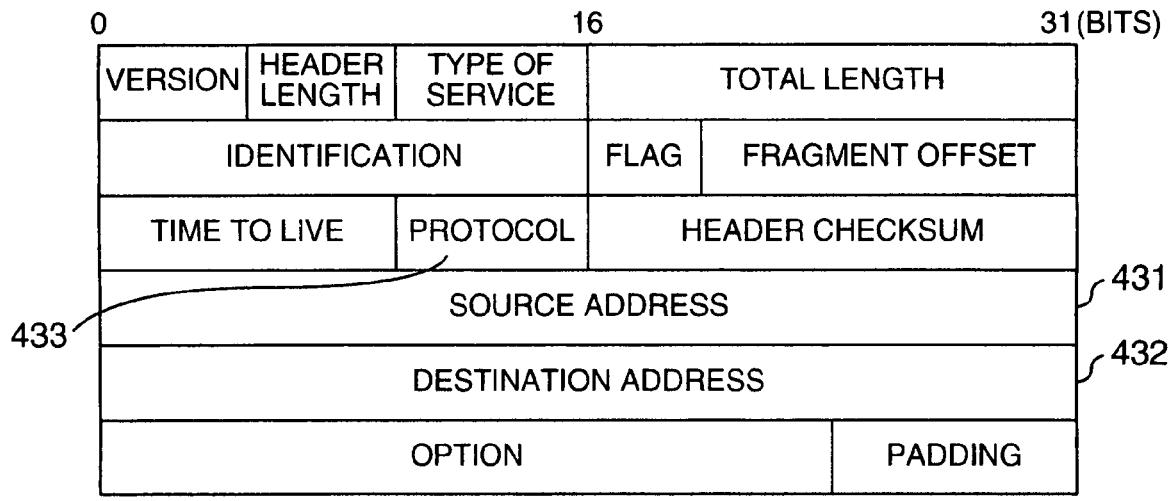
FIG. 7 is a diagram showing a detailed format of an IP header 43.
Figure 8:
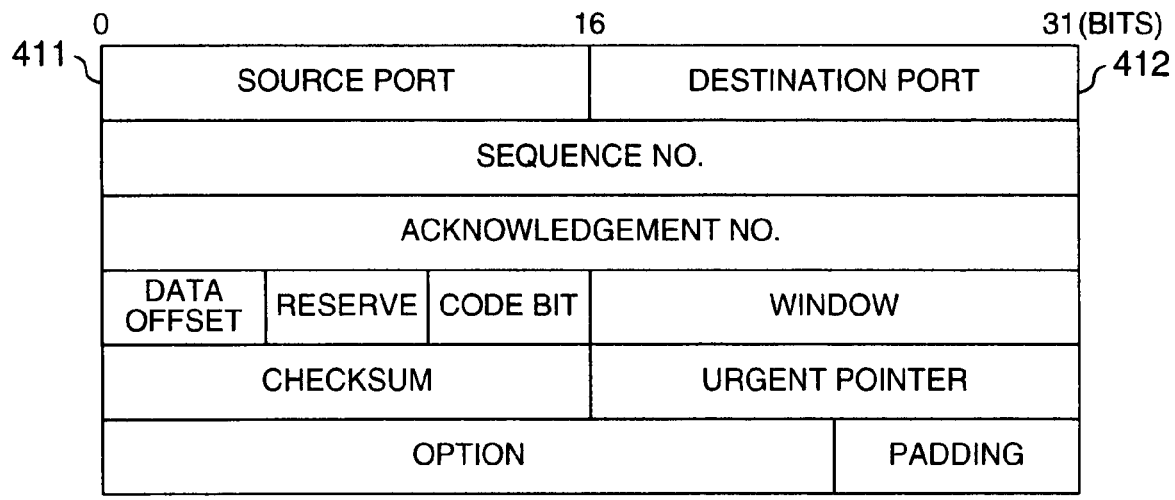
FIG. 8 is a diagram showing a detailed format of a TCP header 41.

FIG. 7 shows a detailed format of the IP header 43, and FIG. 8 a detailed format of the TCP header 41.

Figures 9, 10:
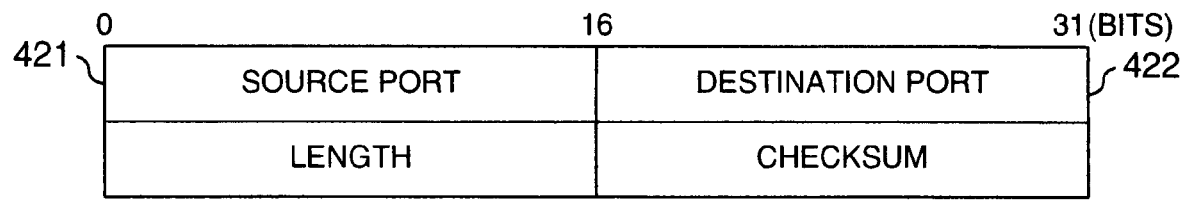
FIG. 9 is a diagram showing a detailed format of a UDP header 42.
FIG. 10 is a diagram showing a classification table 32 showing the classes corresponding to the port numbers.

The TCP header 41 includes a sequence number and header information of other multiple items in addition to the transmitter port number 411 and the destination port number 412 described above. In the case where the protocol number 433 of the IP header is "17", the UDP header 42 shown in FIG. 9 is employed in place of the TCP header. The UDP header 42 also includes the transmitter port number 421 and the destination port number 422 for identifying an application, which constitute a simpler header format than the TCP header.

According to this embodiment, in order that the port number extracted from the TCP (or UDP) header of the transmission packet is set in correspondence with the class, a classification table 32 indicated the correspondence between the class and the port number shown in FIG. 10, for example, is prepared in the QoS control information table memory 30. In the classification table 32, the value of the class 322 is defined in correspondence with the value of the port number 321 applicable to the TCP header and the UDP header.

In the class determining step 1113, the classification processing unit 110 extracts the protocol number 433 from the IP header of the transmission data (transmission packet), determines the applicable protocol from the protocol number, and recognizing the structure of the header of the transport layer in accordance with the applicable protocol, reads the value of the transmitter port number 411 (or 421). Next, the classification table 32 showing the correspondence with the port number in FIG. 10 is searched for an entry in which the port number 321 is coincident with the value of the transmitter port number of the transmission data. Then, the transmission data is set in the transmission queue 112-p corresponding to the value p of the class 322 indicated by the particular entry (step 1114). In the case where the value of the transmitter port number 411 (or 421) is not yet registered in the classification table 32, the transmission data is set in a queue in the default transmission queue.

The read control unit 113 reads the data from the class-wise queue in accordance with the class-wise band assignment table 35 shown in FIG. 14, and thus realizes a predetermined QoS.

According to this embodiment, as long as the data transmission rate of the modem 13 is not lower than a predetermined threshold value, i.e. as long as a congestion is not caused in the transmission buffer 112, rapid data transmission is carried out omitting the QoS control process, while in the case where the data transmission rate decreases below the predetermined threshold value, on the other hand, the QoS control operation corresponding to the port number (type of transmitter application) is carried out and the transmission data is selectively sent out. In this way, the data transmission suitable for the variations of the information transmission rate becomes possible for the radio section.

In a radio communication system, there may be a case in which the required minimum network control operation such as the one defined in IEEE802.1D or the quality of the communication between specific terminals (specific connection) designated in advance is desirably guaranteed even in the case where the information transmission rate is reduced for the radio section. In such a case, according to this invention, a variety of QoS control operations are made possible by preparing a plurality of types of tables in the QoS control information table memory 30, as described below.

FIG. 11 shows a QoS control mode table 33 accessed to switch the QoS control mode to be executed, in accordance with the information transmission rate for the radio section. The QoS control mode table 33 includes a QoS control mode 331 and an enable bit flag column 332 for designating the applicable QoS control mode in accordance with the information transmission rate for the radio section. In the enable bit flag column 332, the range of the information transmission rate X for the radio section is divided into three portions including "X<lower limit threshold B", "lower limit threshold B<X<upper limit threshold A" and "upper limit threshold A<X". In each of these information transmission rate range, the applicable QoS control mode is designated by the enable bit flag.

The QoS control mode "802.1D" determines the class according to the priority indication label of IEEE802.1D. The QoS control mode "port number" determines the class according to the classification table 32 shown in FIG. 10. Also, the QoS control mode "control policy A classification"

determines the class utilizing the classification table 34 showing the correspondence of the MAC address designating the class 342 with the value of the MAC address 341, as shown in FIG. 12, for example.

In the QoS control mode table 33 illustrated here, the enable bit is set to the disable state ("0") for all the QoS control modes in the case where "upper limit threshold value A<X". In the case where the information transmission rate X for the radio section is not lower than the upper limit threshold value A, therefore, the QoS control is omitted and all the transmission data are set in the default transmission queue.

In the case where the information transmission rate X for the radio section is lower than the upper limit threshold value A but not lower than the lower limit threshold value B, the QoS control mode "802.1D" and the QoS control mode "port number" are applicable. With regard to the transmission data with the 802.1D label information attached thereto, therefore, the class is determined from the label information. For the transmission data having no 802.1D label information, on the other hand, the QoS control operation is performed in such a manner as to determine the class from the classification table 32.

In the case under consideration, assuming that the information transmission rate for the radio section is lower than the lower limit threshold value B, the QoS control mode "802.1D" and the QoS control mode "control policy A" are applicable. With regard to the transmission data with the 802.1D label information attached thereto, therefore, the class is determined from the label information. For the transmission data having no 802.1D label information, on the other hand, the QoS control is carried out in such a way as to determine the class from the classification table 34 of the control policy A.

In the case where a transmission packet is transmitted in the form of Ethernet frame, for example, the MAC header for Ethernet including the MAC addresses of the source and the destination is added before the IP header of each transmission data. Thus, as for the transmission data having no 802.1D label information, therefore, the classification processing unit 110 analyzes the MAC header and searches the classification table 34 of the control policy A for an entry in which the address 341 coincides with the source MAC address. Once the entry involved is found, the transmission data is set in the transmission queue 112-$p$ corresponding to the value p indicated by the class 342 of the particular entry. In the case where the entry involved is not found, on the other hand, the transmission data is set in the default transmission queue.

For determining the class, the header information other than the MAC address and the source port number, such as the destination port number or the protocol type such as UDP or TCP may be used. Further, the class for a specific terminal and a specific application can be designated by designating the MAC address and the port number. Also, a terminal can be recognized by an address such as the source/destination IP address other than the MAC address, and the class of the communication data between specific terminals may be determined. In any case, a classification table showing the correspondence between the header item for determination and the class and a class-wise band assignment table may be prepared in the memory 30, so that the relation between the applicable QoS control mode and the information transmission rate for the radio section is designated by the QoS control mode table 33.

The class-wise band assignment table 35 may be created each time the corresponding QoS control mode is assigned, or different tables may be used for different information transmission rates for the radio section.

In the case where the QoS control information table memory 30 is configured of a nonvolatile memory such as NVRAM, the various tables 31 to 35 described above are written in the memory 30 before shipment of the radio transmitter/receiver. Also, updated data are supplied to the particular radio transmitter/receiver in the form of the control message transmitted from a device such as a maintenance PC and then written in the memory 30 by the maintenance software prepared in the control unit 20, as required.

In the case where the memory 30 is configured of a volatile memory such as a RAM, for example, the table contents constituting a master table are written in a ROM or a nonvolatile memory of the control unit 20, and when the radio transmitter/receiver is powered on, the contents of the master table are copied automatically to the memory 30. Alternatively, when power is switched on, the radio transmitter/receiver automatically communicates with the maintenance PC, so that the control unit 20 writes the table contents downloaded from the maintenance PC into the memory 30. According to the latter method, the functions of each radio transmitter/receiver can be readily changed even in the case the applicable QoS control mode or the table contents undergo a change.

Next, the radio transmitter/receiver according to another embodiment of the invention will be explained with reference to FIG. 16.

According to this embodiment, there is provided a radio transmitter/receiver combined with the adaptive modulation, in which the QoS control operation according to the invention is performed by estimating the conditions of the transmission path based on the received power or the bit error rate detected when the radio signal with an error correction code added and modulated by a selected modulation scheme at the transmitting end is demodulated with the error corrected at the receiving end. In accordance with the estimated transmission path conditions, an appropriate modulation scheme is selected from 64 QAM (64-positions quadrature amplitude modulation), 16 QAM (16-positions quadrature modulation), QPSK (quadrature phase shift keying) and BPSK (binary phase shift keying).

Figure 16:
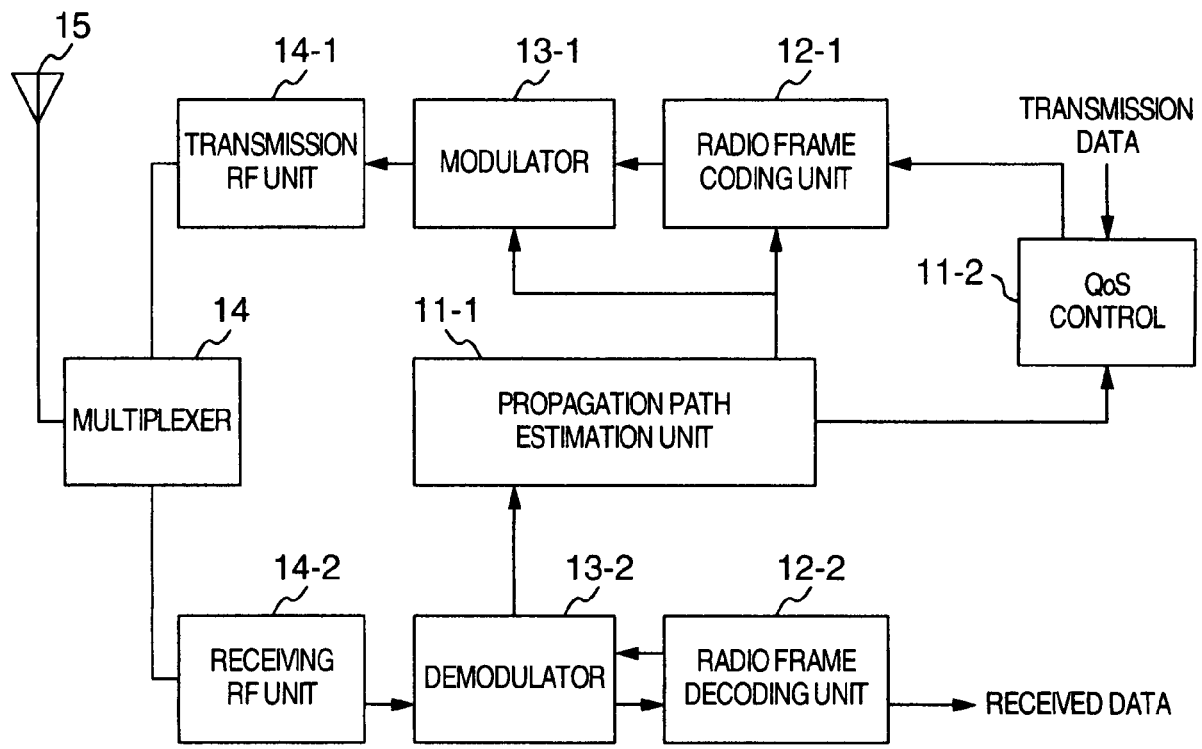
FIG. 16 is a block diagram showing a configuration of a radio transmitter/receiver of adaptive modulation type using the QoS control operation according to an embodiment of the invention.

FIG. 16 is a block diagram showing a configuration of a radio transmitter/receiver according to an embodiment of the invention. This radio transmitter/receiver comprises a QoS control unit 11-2, a radio frame coding unit 12-1, a modulation unit 13-1, a transmission RF unit 14-1, a multiplexer 14, an antenna unit 15, a receiving RF unit 14-2, a demodulator 13-2, a radio frame decoder 12-2 and a propagation path estimation unit 11-1.

The overall operation of the radio transmitter/receiver will be explained. The order in which the transmission data is transmitted is changed by the QoS control unit 11-1, and the transmission data is divided into frames by the radio frame coding unit 12-1, whereby a error correction code, a training bit and a guard bit are added to produce a radio transmission frame. This radio transmission frame is modulated by a predetermined modulation scheme at the modulation unit 13-1, converted into a radio frequency at the transmission RF unit 14-1, and through the multiplexer 14, transmitted into space by way of the antenna unit 15. In the receiving operation, on the other hand, a radio signal is received from the antenna unit 15, and the received radio signal is converted into a baseband signal at the receiving RF unit 14-2 through the multiplexer 14. This baseband signal is demodulated at the demodulation unit 13-2 by a demodulation scheme corresponding to the predetermined modulation scheme, and the demodulated data is decoded with the error corrected at the radio frame decoder 12-2 thereby to produce the received data. The propagation path estimation unit 11-1 estimates the propagation path conditions from the output signal of the demodulator 13-2, and selecting the optimum modulation scheme, designates the modulation scheme for the radio frame coding unit 12-1 and the modulation unit 13-1.

Next, a method of switching the modulation scheme constituting a feature of the invention will be explained.

Figure 17:
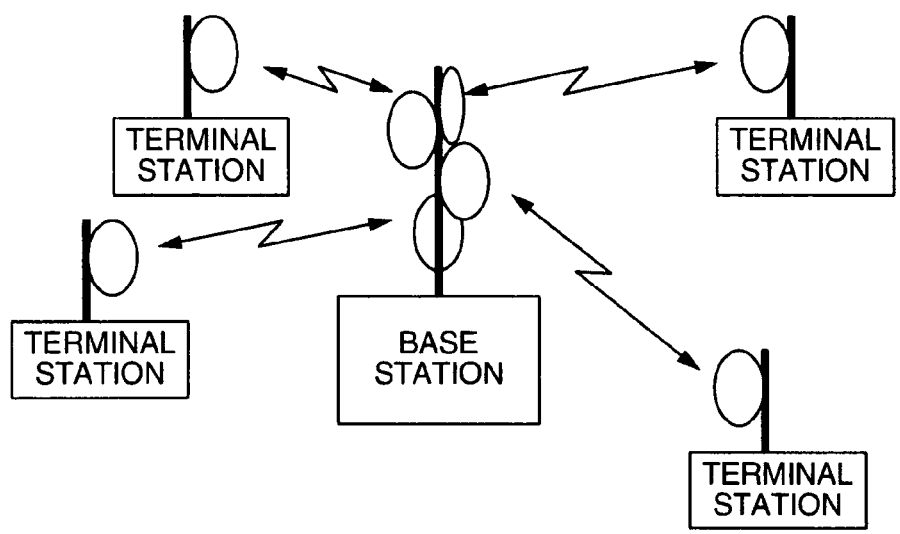
FIG. 17 is a diagram showing a FWA (fixed wireless access) system configuration using the QoS control operation according to the invention.

FIG. 17 shows an example of a FWA (fixed wireless access) system configuration according to the invention, in which the data communication between stations is realized by P-P (point-to-point) connection between a base station and a terminal station.

Figure 18:
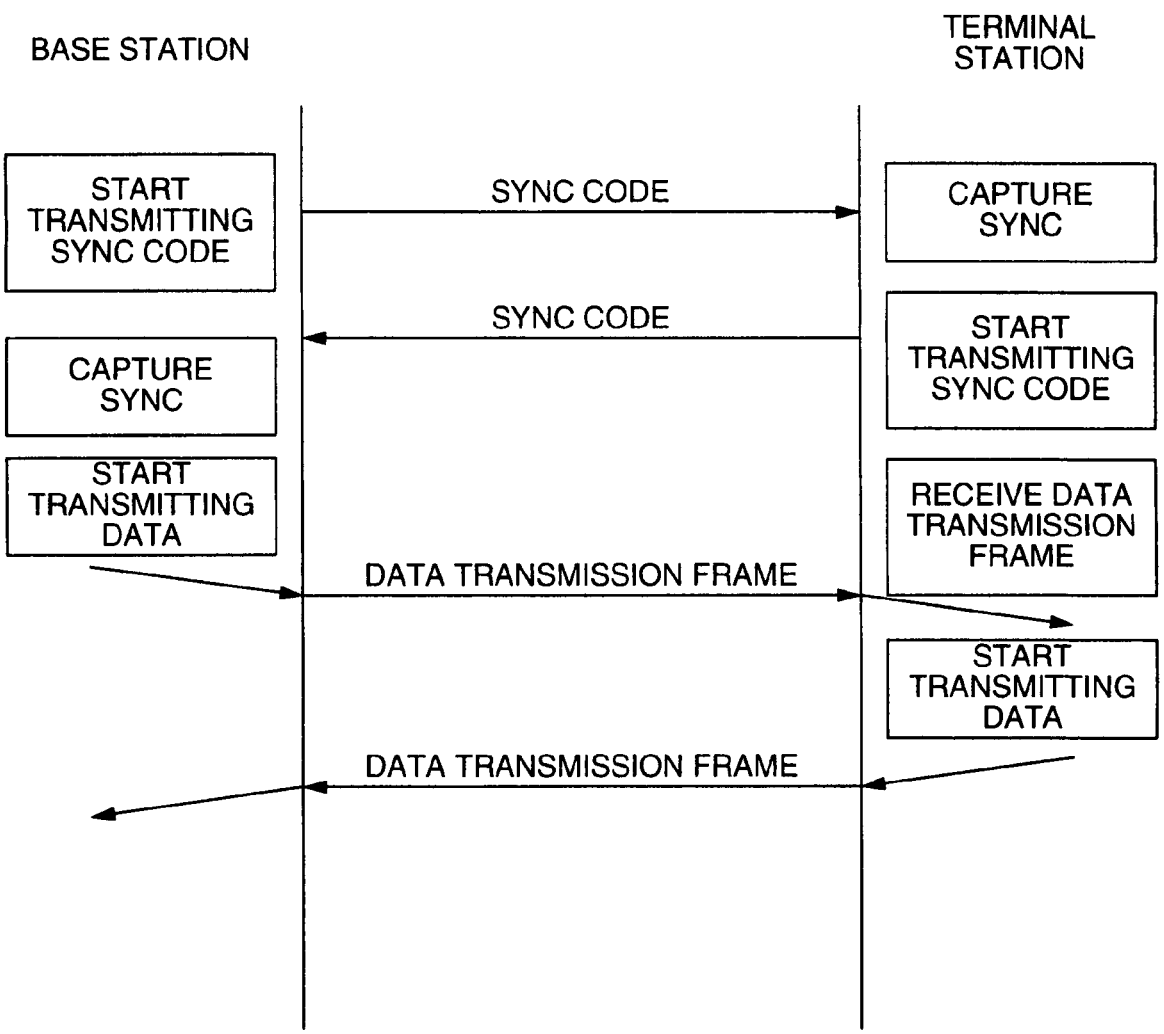
FIG. 18 is a diagram showing an example of the process of P-P connection between a base station and a terminal station.

FIG. 18 is a diagram for explaining the process of connecting a base station and a terminal station by P-P connection. After resetting by switching on power, the base station starts the transmission of a sync code while at the same time starting to capture the synchronization for the receiving operation. The terminal station also starts to capture the synchronization for the receiving operation. Once the receiving synchronization is established, the terminal station starts the transmission of the sync code. The base station, upon establishment of the receiving synchronization, starts the data transmission using the data transmission frame. The terminal station, upon receipt of the data transmission frame, executes the data receiving process, while at the same time starting the data transmission using the data transmission frame. The modulation scheme for the sync frame and the data transmission frame is predetermined between the base station and the terminal station. By starting the communication in this way, synchronization is established between the base station and the radio station thereby to start the transmission/receiving of the data according to the predetermined modulation scheme.

Next, an explanation will be given about the operation of switching the modulation scheme by adaptive modulation after starting the data communication. The adaptive modulation is for realizing efficient communication by switching the modulation scheme in accordance with the propagation path conditions. The parameters for estimating the propagation path generally include the receiving level, the residual error and the bit error rate. This technique is described, for example, in JP-A-10-93650, and "Symbol Rate and Modulation Level-Controlled Adaptive Modulation/TDD System for High-Bit-Rate Wireless Data Transmission" by Toyoki Ue et al., IEEE Trans. on Vehicular Technology, Vol. 47, No. 4, November 1998, which is hereby incorporated by reference. In this embodiment, reference is made to a case in which the propagation path conditions are estimated using the receiving level by the propagation path estimation unit 11-1. The propagation path estimation unit 11-1 regularly receives the receiving level information of the receiving signal from the demodulator 13-2, and by referring to the receiving level-vs-modulation scheme correspondence table shown in FIG. 19, selects a corresponding modulation scheme, and notifies the code indicating the selected modulation scheme to the QoS control unit 11-2, the radio frame coding unit 12-1 and the modulation unit 13-1.

The radio frame coding unit 12-1, in producing a data transmission frame, generates a radio frame containing the code information indicating the modulation scheme notified by the propagation path estimation unit 11-1.

The modulation unit 13-1 reads the code indicating the modulation scheme notified from the propagation path estimation unit 11-1 for each frame processing, and in the case where the code indicating the notified modulation scheme is different from the currently-used modulation scheme, the modulation scheme is changed from the next frame. At the receiving end, on the other hand, the information indicating the modulation scheme is separated from the data transmission frame after error correction decoding at the radio frame decoding unit 12-2 and notified to the demodulator 13-2. In the case where the information on the modulation scheme notified to the demodulator 13-2 is different from the modulation scheme corresponding to the currently-used demodulation scheme, the demodulator 13-2 changes the demodulation scheme from the next frame.

An example of the data transmission frame format is shown in FIG. 20. The data transmission frame is configured of a training bit (TRN) for timing synchronization, a block (RCB: radio control block) for the information indicating the modulation scheme (MODTYPE) and the maintenance information, a block (DTB: data traffic block) for storing the data traffic and a guard bit for separating the frames. The radio frame coding unit 12-1 notifies the remote station of the modulation scheme by setting the modulation scheme to MODTYPE. The RCB is not required to be transmitted for each frame but several frames, or transmitted when switching the modulation scheme, while DTB may be transmitted in other cases. The sync code may be a bit train with scrambled 0s.

In the propagation path estimation unit 11-1, a modulation scheme may be selected using the time average value of the receiving level as required in order to absorb the receiving level variations. Also, the propagation path estimation unit 11-1 can be configured in such a manner as to estimate the propagation path using the result of error correction decoding at the radio frame decoding unit 12-2.

An embodiment in which the P-P connection is employed between a base station and a terminal station is described above. Nevertheless, this invention is applicable also to the P-MP (point-multipoint) connection between a base station and terminal stations with equal effect.

According to this embodiment, a radio base station is preferably installed at a line-of-sight place or a place of unobstructed view. In order to avoid the effect on the base station in operation, however, the place of installation is required to be determined after careful study. Even in the case where the base station is installed at a sufficiently studied place, however, the effect on other base stations may be revealed only after actual installation of the particular base station at the particular place. In such a case, the base station or the subscriber station is equipped with devices for the current system and the spare system, and the operation is switched to the device for the spare system in compliance with a control instruction from a management center or the like. In this way, the radio communication environment of the system can be optimized and the continued communication service is made possible. A radio communication system equipped with a radio transmitter/receiver for the current system and the spare system is disclosed in JP-A-2002-94449.

Embodiments of the invention are described above with reference to the packet transmission using TCP/IP as an example. Nevertheless, the concept of the invention is not limited to the communication protocol specified in the aforementioned embodiments but applicable to other protocols with equal effect.

The read control method is also not limited to the token bucket scheme, but applicable to various schemes including those for reading the transmission data in the descending order of priority from a queue corresponding to a class of high priority.

It will thus be understood from the foregoing description that according to the embodiments described above, the requirement or no requirement of the QoS control is determined in accordance with the information transmission conditions in the radio section thereby to selectively execute the QoS control operation. As compared with the QoS control operation according to the conventional scheme executed all the time, therefore, the transmission delay time of the transmission data can be shortened for an improved throughput. Also, by employing a method of changing the applicable QoS control mode in accordance with the information transmission conditions in the radio section with reference to the QoS control mode table, the data transmission keeping up flexibly with the radio environment is made possible.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A radio transmitter/receiver comprising:
   an adaptive modulation-type transmission unit connected to an antenna; and
   a receiving unit connected to said antenna,
   wherein said adaptive modulation-type transmission unit includes:
   a high frequency unit connected to said antenna,
   a modulation unit connected to said high-frequency unit,
   a radio frame coding unit connected to said modulation unit for converting the transmission data into a format of a modulation scheme corresponding to propagation path conditions in an associated radio transmission path, and
   a Quality of Service (QoS) control unit for supplying the transmission data to said radio frame coding unit in an order taking QoS into consideration,
   wherein said QoS control unit has a first operation mode for outputting the transmission data in an order of input and a second operation mode for outputting the transmission data in the order taking QoS into consideration, said first and second operation modes being switchable to each other in accordance with information transmission conditions in said radio transmission path.

2. A radio transmitter/receiver according to claim 1, further comprising:
   a propagation path estimation unit for estimating the propagation path conditions for the radio transmission path from a signal received by said receiving unit.

3. A radio transmitter/receiver according to claim 2, further comprising:
   a modulation-type selecting unit connected to said propagation path estimation unit for selecting one of a plurality of modulation schemes.

4. A radio transmitter/receiver according to claim 3, wherein said plurality of the modulation schemes include 64 QAM, 16 QAM, QPSK and BPSK.

5. A radio transmitter/receiver according to claim 1, wherein said receiving unit includes means for extracting information on a modulation scheme of received data from said received data.

6. A fixed wireless access (FWA) system comprising:
   a radio base station; and
   a plurality of subscriber stations adapted to communicate with said radio base station by radio,
   wherein a selected one of said radio base station and said subscriber stations includes a radio transmitter/receiver according to claim 1.

7. A radio transmitter/receiver according to claim 1, wherein an information transmission rate for said radio transmission path is obtained from the information on specific bits contained in the received data.

8. A radio transmitter/receiver comprising:
   an adaptive modulation-type transmission unit connected to an antenna; and
   a receiving unit connected to said antenna,
   wherein said adaptive modulation-type transmission unit includes:
   a high frequency unit connected to said antenna,
   a modulation unit connected to said high-frequency unit,
   a radio frame coding unit connected to said modulation unit for converting the transmission data into a format of a modulation scheme corresponding to propagation path conditions in an associated radio transmission path, and
   a Quality of Service (QoS) control unit for supplying the transmission data to said radio frame coding unit in an order determined by QoS,
   wherein said QoS control unit has a first operation mode for outputting the transmission data in an order of input and a second operation mode for outputting the transmission data in the order determined by QoS, said first and second operation modes being switchable to each other in accordance with information transmission conditions in said radio transmission path.

9. A radio transmitter/receiver according to claim 8, further comprising:
   a propagation path estimation unit for estimating the propagation path conditions for the radio transmission path from a signal received by said receiving unit.

10. A radio transmitter/receiver according to claim 9, further comprising:
    a modulation-type selecting unit connected to said propagation path estimation unit for selecting one of a plurality of modulation schemes.

11. A radio transmitter/receiver according to claim 10, wherein said plurality of the modulation schemes include 64 QAM, 16 QAM, QPSK and BPSK.

12. A radio transmitter/receiver according to claim 8, wherein said receiving unit includes means for extracting information on a modulation scheme of received data from said received data.

13. A fixed wireless access (FWA) system comprising:
    a radio base station; and
    a plurality of subscriber stations adapted to communicate with said radio base station by radio,
    wherein a selected one of said radio base station and said subscriber stations comprises:
    said radio transmitter/receiver according to claim 8.

14. A radio transmitter/receiver according to claim 8, wherein an information transmission rate for said radio transmission path is obtained from the information on specific bits contained in the received data.

* * * * *